US008917871B2

(12) United States Patent
Wang (10) Patent No.: US 8,917,871 B2
(45) Date of Patent: Dec. 23, 2014

(54) ASYMMETRICAL CHAOTIC ENCRYPTION (75) Inventor: Xingyuan Wang, Dalian (CN)

(73) Assignee: Empire Technology Development LLC, Wilmington, DE (US)

( * ) Notice: Subject to any disclaimer, the term of this patent is extended or adjusted under 35 U.S.C. 154(b) by 122 days.

(21) Appl. No.: 13/129,796

(22) PCT Filed: Jun. 18, 2010

(86) PCT No.: PCT/CN2010/074034
§ 371 (c)(1),
(2), (4) Date: May 17, 2011

(87) PCT Pub. No.: WO2011/156962
PCT Pub. Date: Dec. 22, 2011

(65) Prior Publication Data
US 2011/0311054 A1    Dec. 22, 2011

(51) Int. Cl.
*H04L 9/28* (2006.01)
*H04L 9/00* (2006.01)
*H04L 9/06* (2006.01)

(52) U.S. Cl.
CPC .............. *H04L 9/0668* (2013.01); *H04L 9/001* (2013.01)
USPC ............................................. 380/277; 380/28

(58) Field of Classification Search
CPC ..................... H04L 29/06673; H04L 63/0442; H04L 9/0825; H04L 9/14
USPC ..................... 380/277, 28; 312/277
See application file for complete search history.

(56) References Cited

U.S. PATENT DOCUMENTS

| 6,014,445 | A  | * | 1/2000 | Kohda et al. ................... 380/28 |
| 8,161,565 | B1 | * | 4/2012 | Langford ......................... 726/30 |
| 2002/0196945 | A1 | * | 12/2002 | Umeno ........................... 380/277 |
| 2003/0118346 | A1 | * | 6/2003 | Umeno et al. ................. 398/140 |
| 2004/0223616 | A1 | * | 11/2004 | Kocarev et al. ................ 380/263 |

FOREIGN PATENT DOCUMENTS

| CN | 1665186 A | 7/2005 |
| CN | 101355684 A | 1/2009 |
| CN | 101739695 A | 6/2010 |
| JP | 09-288565 A | 11/1997 |

OTHER PUBLICATIONS

The State Intellectual Property Office, The P.R. China, International Search Report and Written Opinion of the International Searching Authority for PCT/CN2010/074034.

Xiao, D., et al., A novel key agreement protocol based on chaotic maps, Information Sciences, Feb. 15, 2007, vol. 177, Issue 4, pp. 1136-1142, Elsevier.

(Continued)

*Primary Examiner* — Kambiz Zand
*Assistant Examiner* — Aubrey Wyszynski
(74) *Attorney, Agent, or Firm* — Brundidge & Stanger, P.C.

(57) ABSTRACT

Implementations and techniques for asymmetrical chaotic encryption are generally disclosed. One disclosed method for asymmetrical encryption includes determining a ciphertext control block from data, where the ciphertext control block is based at least in part on one or more Chebyshev polynomials. The method also includes encrypting at least a portion of the data into an encrypted ciphertext block, where the encrypted ciphertext block is based at least in part on Logistic Mapping, and in which a final ciphertext includes the encrypted ciphertext block and the ciphertext control block

24 Claims, 5 Drawing Sheets

(56) References Cited

OTHER PUBLICATIONS

Behnia, S., et al., A fast chaotic encryption scheme based on piecewise nonlinear chaotic maps, Physics Letters A, Jul. 2, 2007, pp. 391-396, vol. 366, Issues 4-5, Elsevier Science B.V.

Baptista, M.S., Cryptography with chaos, Physics Letters A, Mar. 23, 1998, pp. 50-54, vol. 240, Issue 1-2, Elsevier Science B.V.

Wong, Kwok-Wo, et al., A chaotic cryptography scheme for generating short cipertext, Physics Letters A, Apr. 7, 2003, vol. 310, Issue 1, pp. 67-73, Elsevier Science, B.V.

Alvarez, G., et al., Cryptanalysis of an ergodic chaotic cipher, Physics Letters A, May 12, 2003, pp. 172-179, vol. 311, Issues 2-3, Elsevier Science, B.V.

Palacios, A., et al., Cryptography with cycling chaos, Preprint submitted to Elsevier Science, Jun. 26, 2002, accessed online on May 9, 2011 via www.cmi.ac.in/~arghya/summer/crypto.pdf.gz.

Cheong, Kai Y. and Takeshi Koshiba, More on security of public-key cryptosystems based on chebyshev polynomials, IEEE Transactions on Circuits and Systems-II: Express Briefs, Sep. 2007, pp. 795-799, vol. 54, No. 9, IEEE.

Alvarez, Gonzalo, Security problems with a chaos-based deniable authentication scheme, Dec. 9, 2004, Cornell University Library, accessed on May 12, 2011 online via http://arxiv.org/PS_cache/nlin/pdf/0412/0412023v1.pdf.

Liao, X. et al., A digital secure image communication scheme based on chaotic Chebyshev map, International Journal of Communication Systems, Jun. 2004, vol. 17, Issue 5, John Wiley and Sons Ltd., Chichester, UK.

Menezes, A. (Ed.), A note on secure computation of the Moore-Penrose pseudoinverse and its application to secure linear algebra, CRYPTO 2007, LNCS 4622, pp. 613-630, International Association for Cryptologic Research.

Hsu, et al., "Hybrid Information Privacy System: Integration of Chaotic Neural Network and RSA Coding", Proc. SPIE 5818, SPIE, Mar. 28, 2005, p. 165-180.

Aono, et al., "Chaotic Map with Parameter Changing Shape of the Map for a Cryptosystem", [online], Sep. 2008, [search on Feb. 6, 2014]Internet<http://nlab.ee.tokushima-u.ac.jp/nishio/Pub-Data/CONF/C290.PDF>.

H. Yiran, et al., A New Dynamic Key Encryption Algorithm Based on Coupled Chaotic Systems' Information Processing, 2009. APCIP 2009. Asia-Pacific Conference, IEEE, Jul. 2009, Vo. 2, p. 364-366.

Zhe, et al., "A Block Encryption Scheme Based on 3D Chaotic Arnold Maps" 2009 International Asia Symposium on Intelligent Interaction and Affective Computing, IEEE 2009, pp. 15-20.

Yu, et al., "A Chaos-Based Image Encryption Alogorithm Using Wavelet Transform", Advanced Computer Control (ICACC), 2010 2nd International Conference, IEEE, Mar. 2010, vol. 2, pp. 217-222.

Long, et al., "A Chaos-Based Data Encryption Algorithm for Image/Video", 2010 Second International Conference on Multimedia and Information Technology, pp. 172-175, Multimedia and Information Technology (MMIT), 2010 Second International Conference, IEEE, 2010, vol. 1.

Waseda University Advanced Institute for Complex Systems, Information Systems as Complex Systems, Jul. 25, 2007, First Edition, p. 207-208, with attached English translation.

Ljupco Kocarev et al., "Public Key Encryption Based on Chebyshev Maps", Circuits and Systems, 2003, ISCAS'03, Proceedings of the 2003 International Symposium, IEEE, May 2003, vol. 3, III-28-111-31.

Aono, et al., "A Cryptosystem Using Expansion of Chaotic Map", 2007 International Symposium on Nonlinear Theory and its Applications NOLTA'07, pp. 220-223.

* cited by examiner

400 A computer program product.

402 A signal bearing medium.

404 Machine-readable instructions, which, if executed by one or more processors, operatively enable a computing device to:
 determine a public key based at least in part on a private key;
 determine one or more Chebyshev polynomials based at least in part on the determined public key as well as a randomly chosen integer initial value associated with a variable parameter;
 determine a ciphertext control block based at least in part on the determined one or more Chebyshev polynomials;
 determine a Logistic Map value based at least in part on the variable parameter;
 determine a secret key and a shift integer based at least in part on the Logistic Map value;
 determine an encrypted ordinary plaintext block portion of a plaintext file based at least in part on the determined secret key and determined shift integer; and/or
 determine a finally encrypted ciphertext block based at least in part on determined encrypted ordinary plaintext block, the determined secret key, and the determined shift integer.

| 406 a computer-readable medium. | 408 a recordable medium. | 410 a communications medium. |

ASYMMETRICAL CHAOTIC ENCRYPTION

BACKGROUND

Chaotic dynamics techniques have been utilized in encryption. Such chaotic dynamics techniques have some features such as sensitive dependence on initial conditions, ergodicity, and/or cycle tending to infinity. Such chaotic dynamics techniques may be utilized to generate pseudo-random numbers under the control of certain parameters. Therefore, chaotic cryptography has aroused extensive attention, and many scholars have proposed their chaotic cryptosystems in recent years. However, some chaotic cryptosystems based on these chaotic dynamics techniques may have relatively lengthy encryption times and/or may produce resultant ciphertext that may be several times longer as compared to an initial plaintext file.

SUMMARY

In one embodiment of an asymmetrical encryption process, a ciphertext control block may be determined from data. Such a ciphertext control block may be determined based at least in part on one or more Chebyshev polynomials. Such Chebyshev polynomials may be based at least in part on a public key as well as a randomly generated integer initial value associated with a variable parameter. Additionally, at least a portion of the data may be encrypted into an encrypted ciphertext block based at least in part on Logistic Mapping. Such an asymmetrical encryption process may be utilized to generate a final ciphertext that may include one or more encrypted ciphertext blocks and one or more ciphertext control blocks.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

The following description sets forth various examples along with specific details to provide a thorough understanding of the claimed subject matter. It will be understood by those skilled in the art, however, that the claimed subject matter may be practiced without some or more of the specific details disclosed herein. Further, in some circumstances, well-known methods, procedures, systems, components and/or circuits have not been described in detail in order to avoid unnecessarily obscuring the claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, separated, and designed in a wide variety of different configurations, all of which are explicitly contemplated and make part of this disclosure.

This disclosure is drawn, inter alia, to methods, apparatus, and systems related to asymmetrical chaotic encryption.

Asymmetrical chaotic encryption algorithms for secure communication on the basis of Chebyshev polynomials and Logistic Mapping are described below. As used herein, the term "asymmetrical" may refer to processes where a public key and a private key are asymmetric and unequal. For example, an asymmetric key encryption scheme may be designed so that anyone can encrypt messages using a public key, but only the holder of the paired private key can decrypt. As used herein, the term "chaotic" may refer to processes that include dynamical systems that may be highly sensitive to initial conditions.

In one example, such an asymmetrical chaotic encryption algorithm may utilize a public key for encryption operations. Additionally or alternatively, such an asymmetrical chaotic encryption algorithm may include a private key for decryption operations. Additionally or alternatively, such an asymmetrical chaotic encryption algorithm may include a mixture of key encryption and block encryption.

Figure 1:
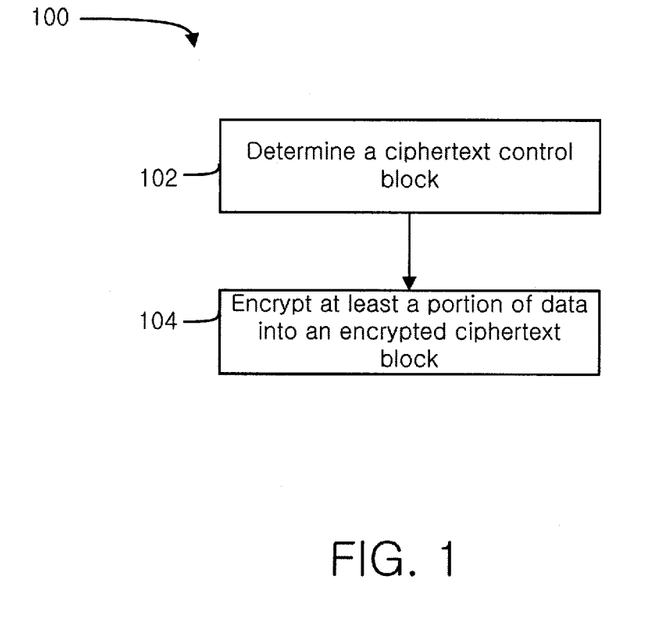
FIG. 1 illustrates an example process for asymmetrical chaotic encryption that is arranged in accordance with at least some embodiments of the present disclosure.

FIG. 1 illustrates an example process for asymmetrical encryption that is arranged in accordance with at least some embodiments of the present disclosure. In the illustrated example, process 100, and other processes described herein, set forth various functional blocks or actions that may be described as processing steps, functional operations, events and/or acts, etc., which may be performed by hardware, software, and/or firmware. Those skilled in the art in light of the present disclosure will recognize that numerous alternatives to the functional blocks shown in FIG. 1 may be practiced in various implementations. For example, although process 100, as shown in FIG. 1, includes one particular order of blocks or actions, the order in which these blocks or actions are presented does not necessarily limit claimed subject matter to any particular order. Likewise, intervening actions not shown in FIG. 1 and/or additional actions not shown in FIG. 1 may be employed and/or some of the actions shown in FIG. 1 may be eliminated, without departing from the scope of claimed subject matter. Process 100 may include one or more of operations as illustrated by blocks 102 and/or 104.

As illustrated, process 100 may be implemented for asymmetrical encryption. Processing may begin at operation 102, "determine a ciphertext control block", where a ciphertext control block may be determined. For example, a ciphertext control block may be determined from data (e.g., a plaintext file) and may be based at least in part on one or more Chebyshev polynomials. Additional details regarding example implementations of ciphertext control blocks and Chebyshev polynomials may be found below in the discussion of FIG. 2. As will be discussed in greater detail in conjunction with FIG. 2, the one or more Chebyshev polynomials may be based at least in part on a public key as well as a randomly generated integer initial value associated with a variable parameter.

Processing may continue from operation 102 to operation 104, "encrypt at least a portion of the data into an encrypted ciphertext block", where at least a portion of the data is encrypted into an encrypted ciphertext block. For example, at least a portion of the data may be encrypted into an encrypted ciphertext block based at least in part on Logistic Mapping. Additional details regarding example implementations of the encrypted ciphertext block and Logistic Mapping may be found below in the discussion of FIG. 2.

In one example, process 100 may be utilized to generate a final ciphertext that includes one or more encrypted ciphertext blocks and one or more ciphertext control blocks. For example, the variable parameter may be modified and one or more subsequent Chebyshev polynomials as well as a subsequent finally encrypted ciphertext block may be determined based at least in part on the modified variable parameter. In one example, the modified variable parameter may be modified based at least in part on the Logistic Mapping performed during the formation of the encrypted ciphertext block. One or more iterations of modifying the variable parameter may be performed until all of the data has been encrypted.

Figure 2:
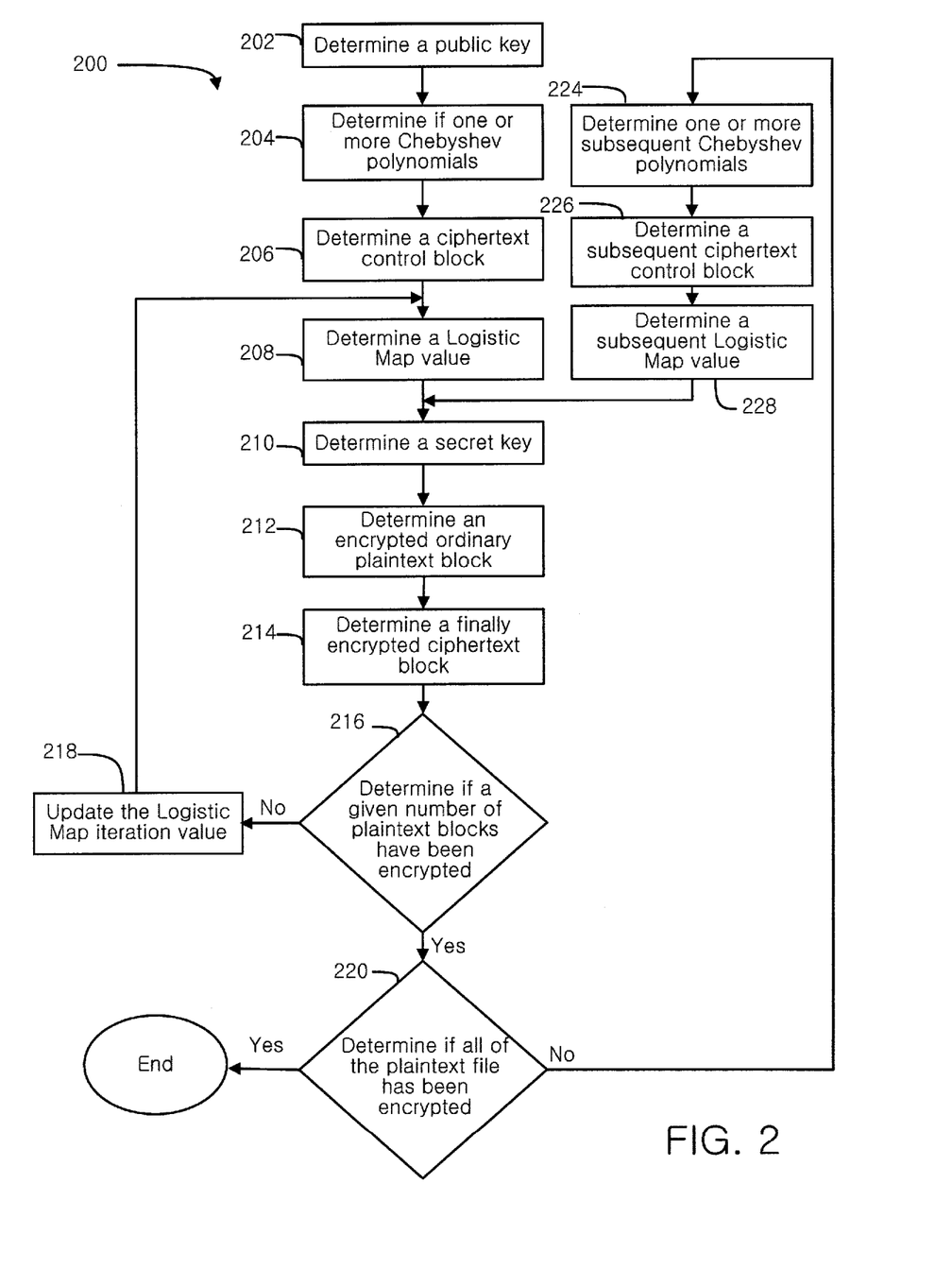
FIG. 2 illustrates another example process for asymmetrical chaotic encryption that is arranged in accordance with at least some embodiments of the present disclosure.

FIG. 2 illustrates another example process for asymmetrical chaotic encryption that is arranged in accordance with at least some embodiments of the present disclosure. Process 200 may include one or more of operations as illustrated by blocks 202, 204, 206, 208, 210, 212, 214, 216, 218, 220, 224, 226, and/or 228.

Process 200 may provide one or more examples of implementations of process 100 of FIG. 1. As illustrated, process 200 may be implemented for asymmetrical chaotic encryption. Processing may begin at operation 202, "determine a public key", where a public key may be determined. For example, a public key may be determined based at least in part on a private key.

In one example, a public key (x,PK) may be determined based at least in part on a Chebyshev polynomial based at least in part on a private key SK. In this example, a randomly generated integer SK (SK≠1) and a randomly generated integer x (x ∈ $F_p$, x≠I), may be utilized to compute:

$$PK = T_{SK}(x)(\text{mod } P)$$

In the above calculation, $F_p$ may represent a finite field, $T_{SK}$ may represent a Chebyshev polynomial of degree SK, and P may represent a prime number. The finite field $F_p$ may be utilized to expand the Chebyshev polynomial $T_{SK}$ to this finite field $F_p$. The prime number P may be a relatively large prime number, which may be used to compute the Chebyshev polynomial $T_{SK}$ and a public key (x,PK). Because the public key (x,PK) utilized as the encryption key may not decrypt a resultant ciphertext while plaintexts are encrypted, the asymmetrical chaotic encryption algorithm represented by process 200 may include the private key SK for decryption operations.

Processing may continue from operation 202 to operation 204, "determine one or more Chebyshev polynomials", where one or more Chebyshev polynomials may be determined. For example, one or more Chebyshev polynomials of degree $R_0$ ($T_{R0}$) may be determined.

In one example, one or more Chebyshev polynomials of degree $R_0$ ($T_{R0}$) may be determined based at least in part on the determined public key (x,PK). In this example, a randomly generated integer $R_0$ (which may be considerer as an initial value for a variable parameter $R_i$) and the determined public key (x,PK) may be utilized to compute a first Chebyshev polynomial $T_{R0}(PK)$ mod P and a second Chebyshev polynomial $T_{R0}(x)$ mod P. In the above calculation, $R_0$ may represent randomly generated integer, where such a randomly generated integer may be sized to be larger than 10,000, for example.

Processing may continue from operation 204 to operation 206, "determine a ciphertext control block", where a ciphertext control block may be determined. For example, a first ciphertext control block $C_{C0}$ may be determined based at least in part on the determined public key (x,PK) and/or the determined one or more Chebyshev polynomials of degree $R_0$, as will be illustrated in greater detail below.

In one example, a plaintext file may be divided into one or more subsequences. Such subsequences may have a designated length of L bytes. In the illustrated example, a value of eight was used for L, however, other values may be utilized. Accordingly, where the plaintext file may be represented by: $p_0 p_1 \ldots p_{L-1} PL \ldots p_{2L-1} p_{2L} \ldots$, the plaintext file may be divided into one or more subsequences. For example, the plaintext file may be divided into a first subsequence $\omega_0$ ($p_0 p_1 \ldots p_{L-1}$), a second subsequence $\omega_1$ ($p_L \ldots p_{2L-1}$), and the like.

Additionally, the bytes of individual subsequences may be combined to form a binary plaintext message block. For example, $p_i$ may represent the value of the jth byte of a given subsequence $\omega_0$. In an example where a value of eight was used for L, eight bytes of plaintext ($p_j + p_{j+1} + \ldots + p_{j+7}$) may be combined to form a binary plaintext message block $P_j$.

Additionally, a block number M may be determined. For example, the block number M may be determined based at least in part on the length of the plaintext file to be encrypted and the length L of the subsequences $\omega_0$. In an example where a value of eight was used for L, the block number M=(l/8)+1, where l may represent the length of the plaintext file to be encrypted.

Additionally, a ciphertext control parameter $m_0$ may be determined. For example, the ciphertext control parameter $m_0$ may be determined based at least in part on block number M and/or the randomly generated integer $R_0$. In one example, the ciphertext control parameter $m_0 = R_0$ (mod M). Such a ciphertext control parameter $m_0$ may be utilized to control the calculation of the Logistic Map initial value $k_0$. The operation of Logistic Mapping as well as the Logistic Map initial value $k_0$ will be discussed in greater detail below with respect to operation 208.

As discussed above, the first ciphertext control block $C_{C0}$ may be determined based at least in part on the determined public key (x,PK) and/or the determined one or more Chebyshev polynomials of degree $R_0$. For example, the determined public key (x,PK) and/or the determined one or more Chebyshev polynomials of degree $R_0$ may be utilized to compute the first ciphertext control block $C_{C0}$ as follows:

$$C_{C0} = (m_0 \cdot T_{R0}(PK) \text{mod } P, T_{R0}(x) \text{mod } P)$$

Processing may continue from operation 206 to operation 208, "determine a Logistic Map value", where a Logistic Map value may be determined. As used herein the term "Logistic Map" may refer to a type of polynomial mapping of degree two that may mimic complex, chaotic behavior through non-linear dynamical equations. For example, the Logistic Map initial value $k_0$ (e.g., an initial value calculated from Logistic Mapping) may be determined based at least in part on the determined ciphertext control parameter $m_0$ (e.g., the ciphertext control parameter $m_0$ itself may be based at least in part on the variable parameter $R_0$, as discussed in greater detail above). In one example, the ciphertext control parameter $m_0$ may be utilized to compute the Logistic Map initial value $k_0$ as follows:

$$k_0 = m_0/P(m_0 < P), P/m_0(m_0 > P), 0.1666666667 \ (m_0 = P)$$

The Logistic Map initial value $k_0$ may be utilized in subsequent iterations of the Logistic Map. Such subsequent iterations of the Logistic Map may be utilized to encrypt one or more additional plaintext blocks, as described in greater detail at operation 218 below. For example, in subsequent iterations, a Logistic Map iteration value ω (e.g. a subsequent value determined from Logistic Mapping associated with the iteration represented by operation 218) may be determined based at least in part on the determined Logistic Map initial value $k_0$. In one example, the Logistic Map initial value $k_0$ may be utilized to compute the Logistic Map iteration value ω as follows:

$$\omega = \tau^{N_0}(k_0)$$

In the above calculation, the Logistic Map iteration value w may represent a value of the Logistic Map initial value $k_0$ after $N_0$ iterations. Further, in the above calculation, τ may represent a Logistic Map function τ(x). The Logistic Map function τ(x) may be utilized to generate a pseudo-random sequence as follows:

$$\tau(x) = \mu x(1-x), x \in [0,1], \mu \in [3.5699456, 4]$$

Processing may continue from operation 208 to operation 210, "determine a secret key", where a secret key may be determined. For example, a secret key $A_j$ may be determined based at least in part on the Logistic Map function τ(x) and/or Logistic Map iteration value ω (e.g., the Logistic Map iteration value ω may represent a value of Logistic Map initial value $k_0$ after $N_0$ iterations).

In one example, binary sequences may be generated based on the one dimension Logistic Map function τ(x). For example, the Logistic Map function τ(x) may be iterated a number of times (e.g., seventy times) to obtain a binary sequence (e.g., $B_i^1 B_i^2 B_i^3 \ldots B_i^{64} B_i^{65} \ldots B_i^{69} B_i^{70}$). Such a binary sequence (e.g., $B_i^1 B_i^2 B_i^3 \ldots B_i^{64} B_i^{65} \ldots B_i^{69} B_i^{70}$) may be formed by adding an ith bit selected from each iteration of the Logistic Map function τ(x).

The secret key $A_j$ and the shift integer $D_j$ may be determined based at least in part on the binary sequence (e.g., $B_i^1 B_i^2 B_i^3 \ldots B_i^{64} B_i^{65} \ldots B_i^{70}$). In one example, the binary sequence (e.g., $B_i^1 B_i^2 B_i^3 \ldots B_i^{64} B_i^{65} \ldots B_i^{69} B_i^{70}$) may be divided into parts. One such part of the binary sequence (e.g., $B_i^1 B_i^2 B_i^3 \ldots B_i^{64} B_i^{65} \ldots B_i^{69} B_i^{70}$) may be the first sixty-four bits (or some other suitable number of bits), which may be utilized to determine the secret key $A_j$ as follows:

$$A_j = B_i^1 B_i^2 B_i^3 \ldots B_i^{64}$$

Another such part of binary sequence (e.g., $B_i^1 B_i^2 B_i^3 \ldots B_i^{64} B_i^{65} \ldots B_i^{69} B_i^{70}$) may be last six bits (or some other suitable number of bits), which may be utilized to determine part $A'_j = B_i^{65} \ldots B_i^{69} B_i^{70}$. The part $A'_j$ may be converted into the shift integer $D_j$, which may be less than sixty-four bits and which may represent the decimal form of such a part of binary sequence (e.g., $B_i^1 B_i^2 B_i^3 \ldots B_i^{64} B_i^{65} \ldots B_i^{69} B_i^{70}$).

Processing may continue from operation 210 to operation 212, "determine an encrypted ordinary plaintext block" where an encrypted ordinary plaintext block may be determined. For example, an encrypted ordinary plaintext block $C_j$ may be determined based at least in part on the shift integer $D_j$ and/or the secret key $A_j$.

In one example, the binary plaintext message block $P_j$ may be shifted (e.g., with left cycle shifting) based on the shift integer $D_j$ bits to obtain a new shifted message block $P'_j$. The secret key $A_j$ may be utilized to compute an encrypted ordinary plaintext block $C_j$ as follows based on the shifted message block $P'_j$:

$$C_j = P'_j \oplus A_j$$

In the above calculation, ⊕ may represent a XOR-type operation. As a result, the encrypted ordinary plaintext block $C_j$ of the binary plaintext message block $P^j$ may be obtained.

Processing may continue from operation 212 to operation 214, "determine a finally encrypted ciphertext block", where a finally encrypted ciphertext block may be determined. For example, a finally encrypted ciphertext block $C''_j$ may be determined based at least in part on the shift integer $D_j$ and/or the secret key $A_j$.

In one example, the encrypted ordinary plaintext block $C_j$ may be divided into one or more partitions (e.g., into eight-bit partitions). For example, the encrypted ordinary plaintext block $C_j$ may be divided into a first encrypted partition ($c_0 c_1 \ldots c_{L-1}$), a second encrypted partition ($c_L \ldots c_{2L-1}$) and the like. Accordingly, the encrypted partition $c_j + c_{j+1} + \ldots + c_{j+7}$ of the corresponding plaintext subsequence $p_j + p_{j+1} + \ldots + p_{j+7}$ may be obtained. Then all the encrypted partition portions of the encrypted ordinary plaintext block $C_j$ may be computed with function mapping as follows:

$$f(C_j) = c_j + c_{j+1} + \ldots + c_{j+7},$$

In the above calculation, the function mapping $f(C_j)$ may be utilized to integrate the encrypted ordinary plaintext block $C_j$, which may be conductive to information storage. After the function mapping, the following operations may be performed:

$$D^* = D_j + f(C_j) \bmod 64,$$

$$C'_j = F(C_j, D_j) \oplus A_j,$$

$$D^* = D_j + f(C'_j) \bmod 64,$$

$$C''_j = F(C'_j, D_j) \oplus A_j.$$

In the above calculations, the encrypted ordinary plaintext block $C_j$ may be shifted (e.g., with left cycle shifting) based on the shift integer $D_j$ bits during the calculation of an intermediate encrypted ordinary plaintext block $C'_j$, which may in turn be shifted (e.g., with left cycle shifting) based on the shift integer $D_j$ bits during the calculation of the finally encrypted ciphertext block $C''_j$. Similarly, the encrypted ordinary plaintext block $C_j$ may be encrypted based on the secret key $A_j$ during the calculation of the intermediate encrypted ordinary plaintext block $C'_j$, which may in turn be encrypted based on the secret key $A_j$ during the calculation of the finally encrypted ciphertext block $C''_j$. In the above calculations, $D^*$ may represent a variable which is associated with a transformation of the shift integer $D_j$ variable.

Additionally, in the above calculations, a modified shift integer $D^*$ may be determined. For example, the modified shift integer $D^*$ may be determined based at least in part on the shift integer $D_j$ and function mapping of the intermediate encrypted ordinary plaintext block $C'_j$. Such a modified shift integer $D^*$ may be utilized to control the iteration times of the Logistic Map.

Processing may continue from operation 214 to operation 216, "determine if a given number of plaintext blocks have been encrypted", where a determination may be made as to whether a given number of plaintext blocks have been encrypted. In cases where a given number of plaintext blocks (e.g., $m_{i-1}$ (i>2)) are not determined to have been encrypted, processing may continue from operation 216 to operation 218, "update Logistic Map iteration value", where the Logistic Map iteration value may be updated. For example, the Logistic Map iteration value ω may be updated as follows:

$$\omega = \tau^{D^* + 70}(k_i)$$

In the above calculation, the updated Logistic Map iteration value $\omega$ may be updated based on a Logistic Map value $k_i$ associated with the current iteration and/or based on the modified shift integer $D^*$ (e.g., the modified shift integer $D^*$ itself may be based at least in part on the shift integer $D_j$, as discussed in greater detail above). The updated Logistic Map iteration value $\omega$ may be utilized in subsequent iterations of the Logistic Map. Processing may continue from operation 218 back to operations 208-216, which have been previously described. Operations 208-216 may proceed to process one or more additional plaintext blocks with the updated Logistic Map iteration value $\omega$.

In cases where a given number of plaintext blocks (e.g., $m_{i-1}$ (i>2)) are determined to have been encrypted, processing may continue from operation 216 to operation 220, "determine if all of the plaintext file has been encrypted", where a determination may be made as to whether all of the plaintext file has been encrypted. In cases where it is determined that all of the plaintext file has been encrypted, process 200 completes.

In cases where it is determined that all of the plaintext file has not been encrypted, process 200 may proceed from operation 220 to operation 224, "determine one or more subsequent Chebyshev polynomials", where one or more subsequent Chebyshev polynomials may be determined. For example, one or more subsequent Chebyshev polynomials of degree $R_i$ ($T_{Ri}$) may be determined based at least in part on a modified variable parameter $R_i$. In one example, the modified variable parameter $R_i$ may be determined based at least in part on a prior variable parameter $R_{i-1}$ (e.g., the initial variable parameter $R_0$) and/or the modified shift integer $D^*$ (e.g., the modified shift integer $D^*$ itself may be based at least in part on the shift integer $D_j$, as discussed in greater detail above). The modified variable parameter $R_i$ may be determined as follows based on the prior variable parameter $R_{i-1}$ (e.g., the initial variable parameter $R_0$) and the modified shift integer $D^*$:

$$R_i = R_{i-1} + D^*,$$

In the above calculation, the modified variable parameter $R_i$ may be subject to random perturbation. In one example, one or more subsequent Chebyshev polynomials of degree $R_i$ ($T_{Ri}$) may be determined based at least in part on the determined public key (x,PK). In this example, the modified variable parameter $R_i$ and the determined public key (x,PK) may be utilized to compute a first subsequent Chebyshev polynomial $T_{Ri}(PK)$ mod P and a second subsequent Chebyshev polynomial $T_{Ri}(x)$ mod P.

Processing may continue from operation 224 to operation 226, "determine a subsequent ciphertext control block", where a subsequent ciphertext control block may be determined. For example, a subsequent ciphertext control block $C_{Ci}$ may be determined based at least in part on the determined public key (x,PK) and/or the determined one or more Chebyshev polynomials of degree $R_i$, as will be illustrated in greater detail below.

In one example, a subsequent ciphertext control parameter $m_i$ may be determined. For example, the subsequent ciphertext control parameter $m_i$ may be determined based at least in part on the block number M and/or the modified variable parameter $R_i$. In one example, the subsequent ciphertext control parameter $m_i = (m_{i-1} + D^*)$ mod M. Such a subsequent ciphertext control parameter $m_i$ may be utilized to control the calculation of a Logistic Map subsequent value $k_i$. The operation of the Logistic Mapping as well as the Logistic Map subsequent value $k_i$ will be discussed in greater detail below with respect to operation 228.

As discussed above, the subsequent ciphertext control block $C_{Ci}$ may be determined based at least in part on the determined public key (x,PK) and/or the determined one or more Chebyshev polynomials of degree $R_i$. For example, the determined public key (x,PK) and/or the determined one or more Chebyshev polynomials of degree $R_i$ may be utilized to compute the subsequent ciphertext control block $C_{Ci}$ as follows:

$$C_{Ci} = (m_i \cdot T_{Ri}(PK) \bmod P, T_{Ri}(x) \bmod P),$$

Processing may continue from operation 226 to operation 228, "determine a subsequent Logistic Map value", where a subsequent Logistic Map value may be determined. For example, the Logistic Map subsequent value $k_i$ may be determined based at least in part on the determined subsequent ciphertext control parameter $m_i$. In one example, the subsequent ciphertext control parameter $m_i$ may be utilized to compute the Logistic Map subsequent value $k_i$ as follows:

$$k_i = m_i / P(m_i < P), P m_i (m_i > P), 0.1666666667 \ (m_i = P)$$

The Logistic Map subsequent value $k_i$ may be utilized in subsequent iterations of the Logistic Map. In subsequent iterations, an updated Logistic Map iteration value $\omega$ may be determined based at least in part on the determined Logistic Map subsequent value $k_i$. In one example, the Logistic Map subsequent value $k_1$ may be utilized to compute the updated Logistic Map iteration value $\omega$ as follows:

$$\omega = \tau^{N_0}(k_i)$$

Processing may continue from operation 228 back to operations 208-216, which have been previously described. Operations 208-216 may proceed to process one or more additional plaintext blocks with the updated Logistic Map iteration value $\omega$.

In operation, process 200 may utilize the ciphertext control blocks $C_{Ci}$ generated by usage of Chebyshev polynomials and the finally encrypted ciphertext block $C''_j$ generated by usage of Logistic Mapping to encrypt the binary plaintext message block $P_j$. Process 200 may utilize the ciphertext control blocks $C_{Ci}$ to conceal the ciphertext control parameters $m_i$ and the Logistic Map values $k_i$. Likewise, process 200 may utilize the finally encrypted ciphertext block $C''_j$, encrypted by the Logistic mapping, to conceal the plaintext itself. For a final ciphertext including both the ciphertext control blocks $C_{Ci}$ and the finally encrypted ciphertext blocks $C''_j$, the make-up of the both the ciphertext control blocks $C_{Ci}$ and the finally encrypted ciphertext blocks $C''_j$ may be similar in nature (e.g., the Eigen values may not be obvious). For example, the distribution of the ciphertext control blocks $C_{Ci}$ may be random, thereby process 200 may cut off the continuity of the finally encrypted ciphertext blocks $C''_j$.

Process 200 may operate in such a way that the finally encrypted ciphertext block $C''_j$ may be dependent on the original plaintext file. Further, process 200 may operate in such a way that the key streams of the secret key $A_j$ generated by the same initial value are not the same. Process 200 may operate to combine a generation of the public key (x,PK) that is extended to the finite field $F_p$ with a generation of the key stream of different secret keys $A_j$, which may be dependent on the plaintext file to continually change initial values that generate the key stream of the secret keys $A_j$. Further, the initial key value of the secret keys $A_j$ may not be displayed to a user on the encryption side or decryption side, but only in the encryption and decryption procedures, which may enhance the concealment performance of information.

In addition, process 200 may utilize Logistic Mapping so that when the secret key $A_j$ generated by the Logistic Mapping is used to encrypt the binary plaintext message block $P_j$, the statistical properties may be disappeared or reduced, and the chaotic disorder of such Logistic Mapping can make differences of the key streams of the secret key $A_j$ quite obvious. Regarding the chaotic disorder of such Logistic Mapping, a histogram of the key streams of the secret key $A_j$ may be relatively uniform and may be significantly different from that of other key streams. These two features (i.e., the reduction of the statistical properties and the chaotic disorder) may make it difficult to decipher a final ciphertext (including both the ciphertext control blocks $C_{Ci}$ and the finally encrypted ciphertext blocks $C''_j$). For example, process 200 may utilize the random variable perturbation parameter $R_i$ as a feature of this algorithm. As discussed above, the random variable perturbation parameter $R_i$ may be generated randomly. Additionally, each binary plaintext message block $P_j$ may be encrypted multiple times to reach the finally encrypted ciphertext block $C''_j$. The combination of process 200 utilizing random generation of the random variable perturbation parameter $R_i$ with the multiple encryptions of each binary plaintext message block $P_j$ may result in the length of the finally encrypted ciphertext block $C''_j$ not being a consistent length. Accordingly, process 200 may resist analysis methods of traditional cryptography, as each time that the value of random variable perturbation parameter $R_i$ is different, then the individual finally encrypted ciphertext blocks $C''_j$ may likewise be different, so it may be difficult to decipher a final ciphertext (including both the ciphertext control blocks $C_{Ci}$ and the finally encrypted ciphertext blocks $C''_j$) through a chosen-ciphertext attack or chosen-plaintext attack.

Figure 3:
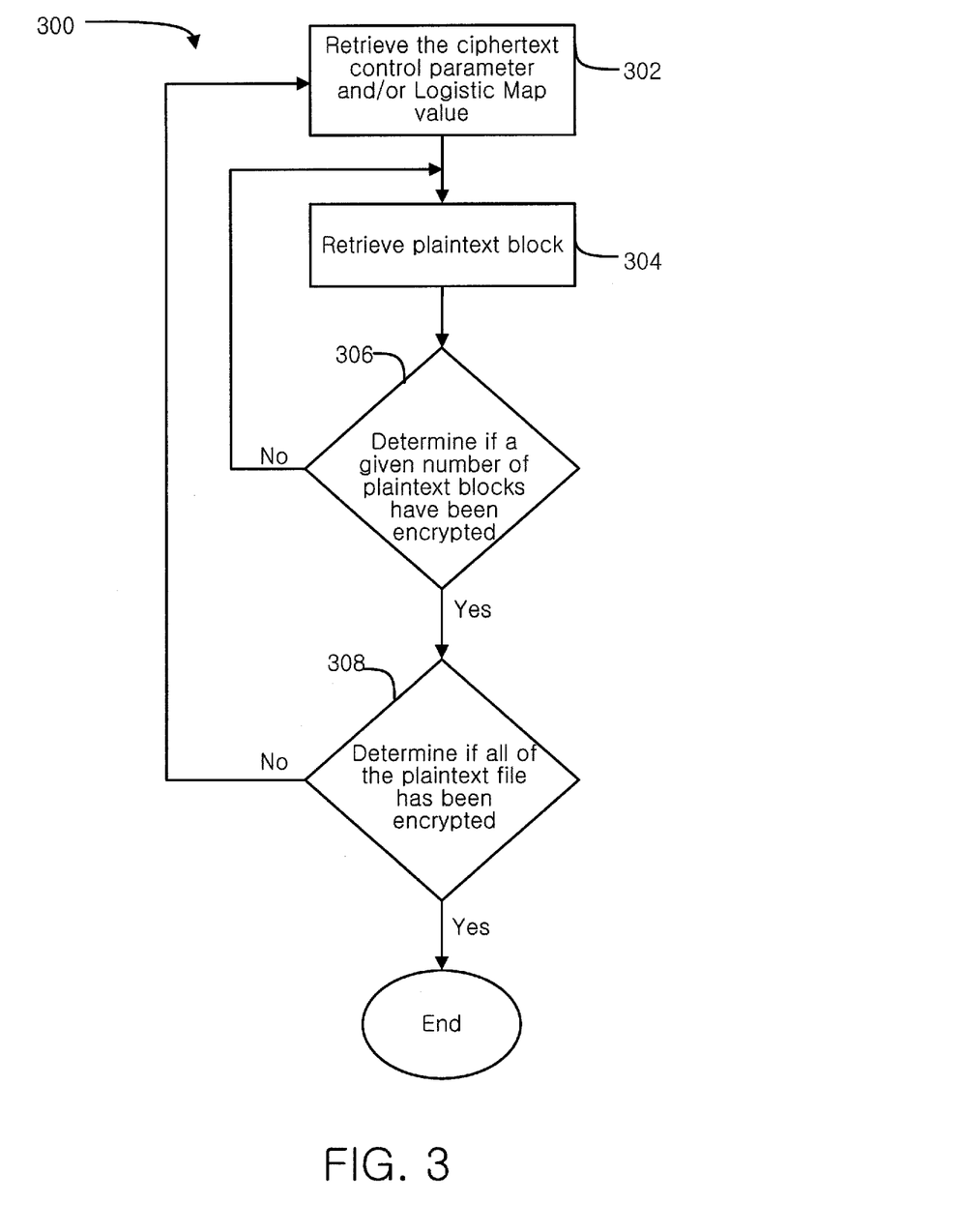
FIG. 3 illustrates an example process for asymmetrical chaotic decryption that is arranged in accordance with at least some embodiments of the present disclosure.

FIG. 3 illustrates an example process for asymmetrical chaotic decryption that is arranged in accordance with at least some embodiments of the present disclosure. Process 300 may include one or more of operations as illustrated by blocks 302, 304, 306, and/or 308.

As illustrated, process 300 may be implemented for asymmetrical chaotic decryption. As discussed above, process 200 (FIG. 2) may utilize the ciphertext control blocks $C_{Ci}$ to conceal the ciphertext control parameters $m_i$ and the Logistic Map values $k_i$, and may utilize the finally encrypted ciphertext block $C''_j$, encrypted by the Logistic mapping, to conceal the plaintext itself. Similarly, process 300 may utilize the ciphertext control blocks $C_{Ci}$ to retrieve the ciphertext control parameters $m_i$ and the Logistic Map values $k_i$, and may utilize the finally encrypted ciphertext block $C''_j$, encrypted by the Logistic mapping, to retrieve the plaintext itself.

Processing may begin at operation 302, "retrieve the ciphertext control parameter and/or Logistic Map value", where the ciphertext control parameter and/or the Logistic Map value may be retrieved. For example, the ciphertext control parameter $m_0$ and/or the Logistic Map initial value $k_0$ may be retrieved from the first ciphertext control block $C_{C0}$. In one example, the first ciphertext control block $C_{C0}$ may be decrypted using the private key SK to compute:

$$m_0 = m_0 \cdot T_{R0}(PK) \bmod P / T_{SK}(T_{R0}(x) \bmod P) \bmod P$$

$$k_0 = m_0/P(m_0 < P), P/m_0(m_0 > P), 0.1666666667\ (m_0 = P)$$

In the above calculations, the ciphertext control parameter $m_0$ and/or the Logistic Map initial value $k_0$ may be retrieved from the first ciphertext control block $C_{C0}$. The retrieved ciphertext control parameter $m_0$ and/or the Logistic Map initial value $k_0$ may be utilized to decrypt the subsequent ciphertext control block $C_{Ci}$.

Processing may continue from operation 302 to operation 304, "retrieve plaintext block" where a plaintext block may be retrieved. For example, retrieving a plaintext block from the one or more finally encrypted ciphertext block $C''_j$, may be based at least in part on the retrieved Logistic Map initial value $k_0$. As discussed above, a secret key $A_j$ may be determined based at least in part on the Logistic Map function $\tau(x)$ and/or the Logistic Map iteration value $\omega$ (e.g., the Logistic Map iteration value $\omega$ may represent a value of Logistic Map initial value $k_0$ after $N_0$ iterations). An encrypted ordinary plaintext block $C_j$ may be decrypted based at least in part on the shift integer $D_j$ and/or the secret key $A_j$ to obtain the binary plaintext message block $P_j$.

In one example, the secret key $A_j$ may be utilized to compute the shifted message block $P'_j$ based on the encrypted ordinary plaintext block $C_j$ as follows:

$$P'_j = C_j \oplus A_j$$

In the above calculation, the encrypted ordinary plaintext block $C_j$ of the binary plaintext message block $P_j$ may be decrypted to compute the shifted message block $P'_j$. The shifted message block may be un-shifted (e.g., with right cycle shifting) based on the shift integer $D_j$ bits to obtain the binary plaintext message block $P_j$. The Logistic Mapping may then be iterated (e.g., iterated $D^*$ times), until reaching the $m_1$ block.

Processing may continue from operation 304 to operation 306, "determine if a given number of plaintext blocks have been decrypted", where a determination may be made as to whether a given number of plaintext blocks have been decrypted. In cases where a given number of plaintext blocks (e.g., $m_1$ (i>2)) are not determined to have been decrypted, processing may continue from operation 306 back to operation 304 "retrieve plaintext block", which has been previously described. For example, the Logistic Map value $k_i$ may be updated based at least in part on the shift integer $D_j$ and utilized to retrieve an additional plaintext block. An iteration of updating the Logistic Map value $k_i$ may be performed until a given number of plaintext blocks are decrypted.

In cases where a given number of plaintext blocks (e.g., $m_{i-1}$ (i>2)) are determined to have been decrypted, processing may continue from operation 306 to operation 308, "determine if all of the plaintext file has been decrypted", where a determination may be made as to whether all of the plaintext file has been decrypted. In cases where it is determined that all of the plaintext file has been decrypted, process 300 completes.

In cases where it is determined that all of the plaintext file have not been decrypted, process 300 may proceed from operation 308 back to operation 302 "retrieve the ciphertext control parameter and/or Logistic Map value", which has been previously described. For example, an iteration of retrieving of a subsequent Logistic map value from a subsequent ciphertext control block may be performed until all of the plaintext file has been decrypted.

Referring to FIG. 1, FIG. 2 and FIG. 3, certain aspects regarding process 300 have not been described in detail. For example, it will be appreciated that operations 302 and/or 304 may utilize all or portions of process 200 to perform the decryption process 300. The decryption process 300 may operate in a manner similar to the encryption process 200. For example, the decryption process 300 may utilize a reversal of the same or similar operations as described in operations 208, 210, 212, 214 and/or 218 to reverse the encryption performed by encryption process 200.

In operation, the processes 100, 200, and/or 300 may be utilized in embedded devices, mobile phones, portable devices, and/or the like. The processes 100, 200, and/or 300 may be utilized to protect personal privacy and/or applied to secure communications. For example, the processes 100, 200, and/or 300 may be utilized to protect personal privacy of image files. Further, the processes 100, 200, and/or 300 may be utilized in equipment that may have relatively low computing capabilities, because of the relatively fast speed of encryption and decryption.

Figure 4:
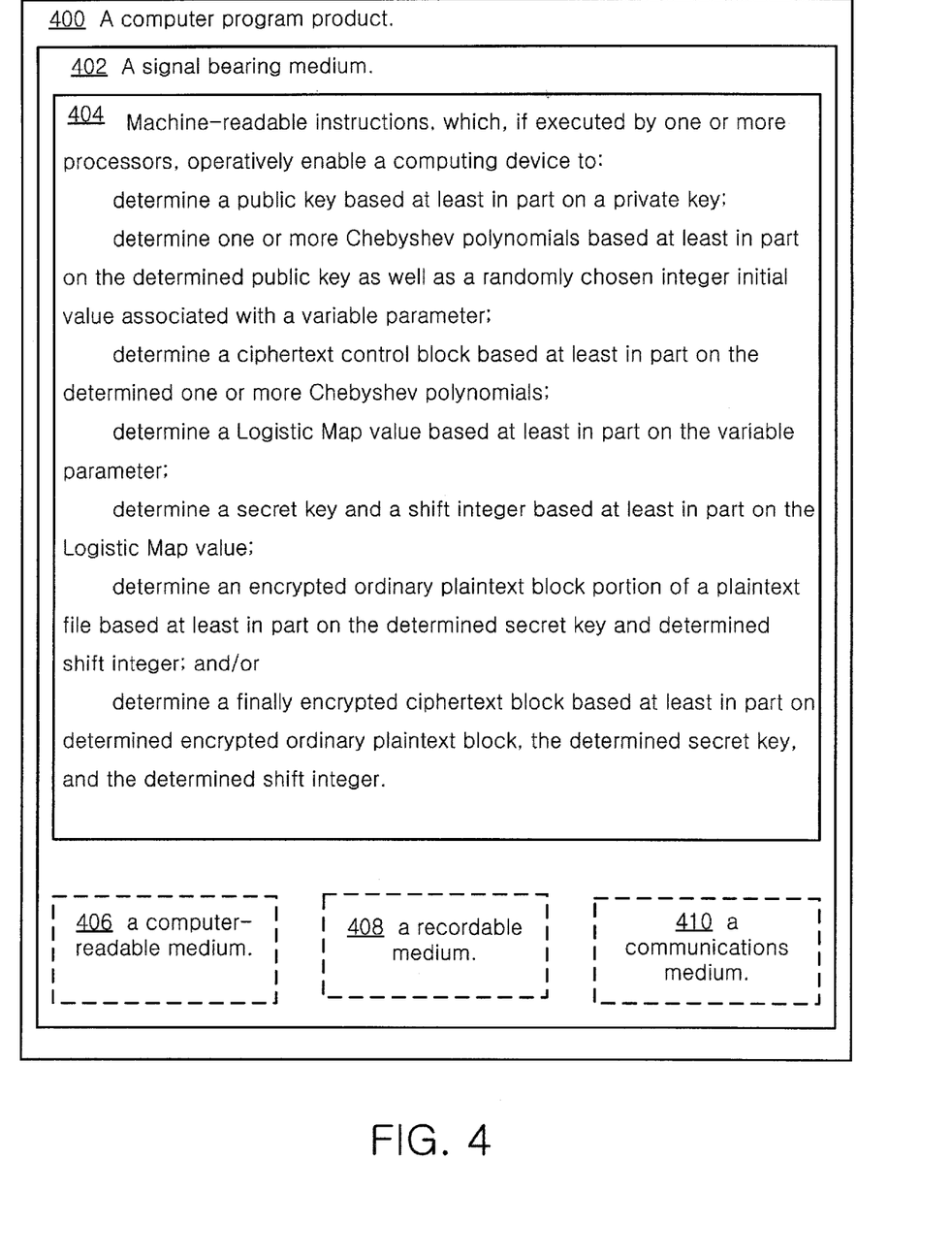
FIG. 4 is an illustration of an example computer program product that is arranged in accordance with at least some embodiments of the present disclosure.

FIG. 4 illustrates an example computer program product 400 that is arranged in accordance with at least some embodiments of the present disclosure. Computer program product 400 may include a signal bearing medium 402. Signal bearing medium 402 may include one or more machine-readable instructions 404, which, when executed by one or more processors, may operatively enable a computing device to provide the functionality described above with respect to FIG. 1, FIG. 2 and/or FIG. 3. Thus, for example, one or more of the actions shown in FIG. 1, FIG. 2 and/or FIG. 3 may be undertaken in response to instructions 404 conveyed by medium 402.

In some implementations, signal bearing medium 402 may encompass a computer-readable medium 406, such as, but not limited to, a hard disk drive, a Compact Disc (CD), a Digital Video Disk (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communication link, a wireless communication link, etc.).

Figure 5:
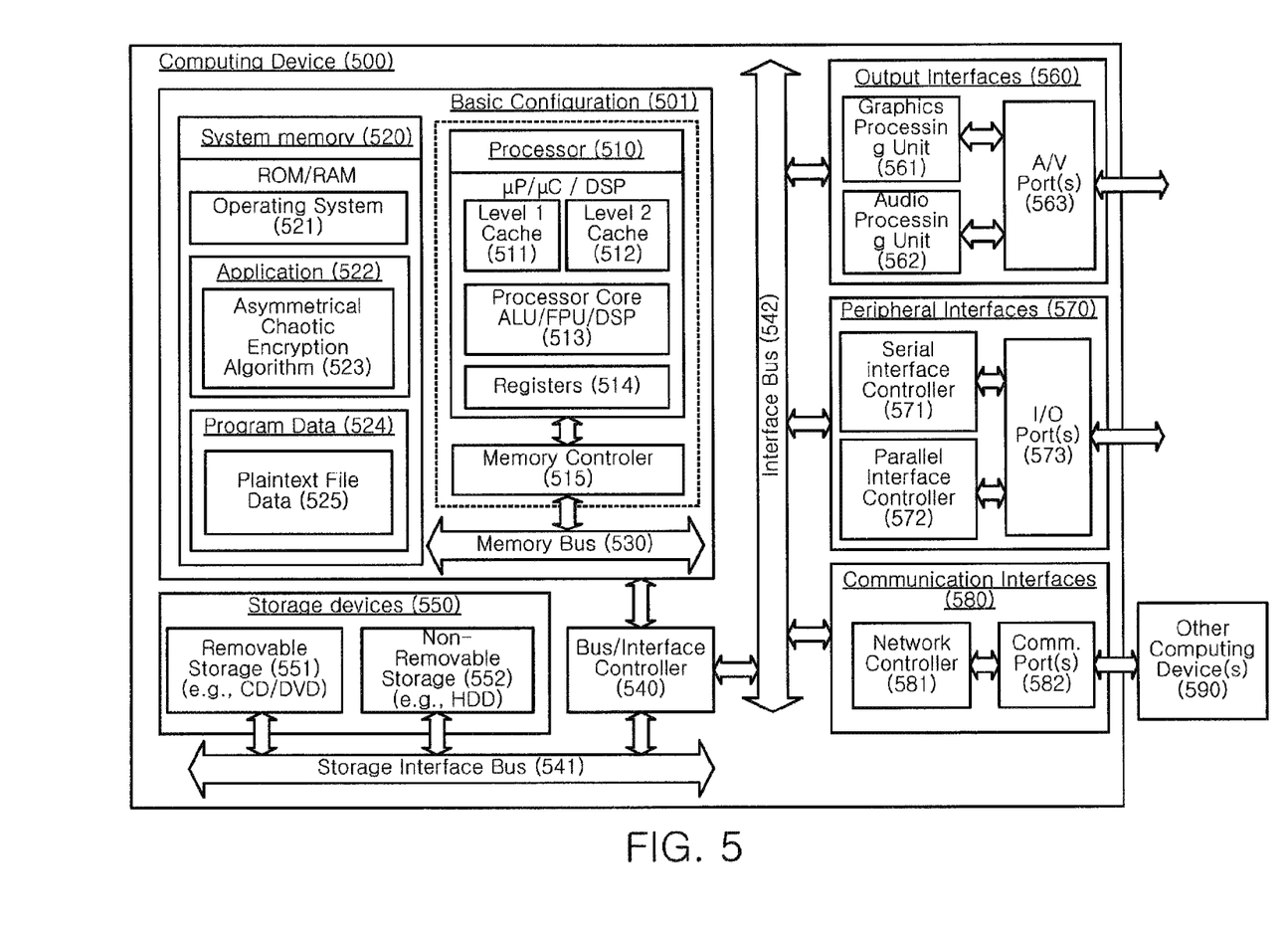
FIG. 5 is a block diagram of an illustrative embodiment of a computing device arranged in accordance with the present disclosure.

FIG. 5 is a block diagram of an illustrative embodiment of a computing device 500 that is arranged in accordance with the present disclosure. In one example basic configuration 501, computing device 500 may include one or more processors 510 and a system memory 520. A memory bus 530 can be used for communicating between the processor 510 and the system memory 520.

Depending on the desired configuration, processor 510 may be of any type including but not limited to a microprocessor (µP), a microcontroller (µC), a digital signal processor (DSP), or any combination thereof. Processor 510 can include one or more levels of caching, such as a level one cache 511 and a level two cache 512, a processor core 513, and registers 514. Processor core 513 can include an arithmetic logic unit (ALU), a floating point unit (FPU), a digital signal processing core (DSP Core), or any combination thereof. A memory controller 515 can also be used with processor 510, or in some implementations memory controller 515 can be an internal part of processor 510.

Depending on the desired configuration, the system memory 520 may be of any type including but not limited to volatile memory (such as RAM), non-volatile memory (such as ROM, flash memory, etc.) or any combination thereof. System memory 520 may include an operating system 521, one or more applications 522, and program data 524. Application 522 may include asymmetrical chaotic encryption algorithm 523 that can be arranged to perform the functions, actions, and/or operations as described herein including the functional blocks, actions, and/or operations described with respect to process 100 of FIG. 1, process 200 of FIG. 2 and/or process 300 of FIG. 3. Program Data 524 may include plaintext file data 525 for use with the asymmetrical chaotic encryption algorithm 523. In some example embodiments, application 522 may be arranged to operate with program data 524 on an operating system 521 such that implementations of asymmetrical chaotic encryption of plaintext file data may be provided as described herein. This described basic configuration is illustrated in FIG. 5 by those components within dashed line 501.

Computing device 500 may have additional features or functionality, and additional interfaces to facilitate communications between basic configuration 501 and any required devices and interfaces. For example, a bus/interface controller 540 may be used to facilitate communications between basic configuration 501 and one or more data storage devices 550 via a storage interface bus 541. Data storage devices 550 may be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of device 500.

Computing device 500 may also include an interface bus 542 for facilitating communication from various interface devices (e.g., output interfaces, peripheral interfaces, and communication interfaces) to basic configuration 501 via bus/interface controller 540. Example output interfaces 560 may include a graphics processing unit 561 and an audio processing unit 562, which may be configured to communicate to various external devices such as a display or speakers via one or more A/V ports 563. Example peripheral interfaces 570 may include a serial interface controller 571 or a parallel interface controller 572, which may be configured to communicate with external devices such as input devices (e.g., keyboard, mouse, pen, voice input device, touch input device, etc.) or other peripheral devices (e.g., printer, scanner, etc.) via one or more I/O ports 573. An example communication interface 580 includes a network controller 581, which may be arranged to facilitate communications with one or more other computing devices 590 over a network communication via one or more communication ports 582. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 500 may also be implemented as a personal computer including both laptop computer and non-laptop computer configurations. In addition, computing device 500 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/ or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A non-transitory computer-readable medium storing instructions that, when executed, cause one or more processors to perform operations for asymmetrical encryption, comprising:
    determining a ciphertext control block from data to conceal one or more ciphertext control parameters, the ciphertext control block based at least in part on one or more Chebyshev polynomials; and
    encrypting at least a portion of the data into an encrypted ciphertext block to conceal the data, the encrypted ciphertext block based at least in part on Logistic Mapping, wherein a final ciphertext includes the encrypted ciphertext block and the ciphertext control block, and wherein the one or more ciphertext control parameters are determined based at least in part on a randomly generated integer, a length of the portion of the data, and a count of subsequences that the data is divided into.

2. The computer-readable medium of claim 1, wherein the one or more Chebyshev polynomials are based at least in part on a public key and a randomly generated integer initial value associated with a variable parameter.

3. The computer-readable medium of claim 2, further comprising:
    modifying the variable parameter and determining one or more subsequent Chebyshev polynomials and a subsequent finally encrypted ciphertext block based at least in part on the modified variable parameter, wherein the modified variable parameter is modified based at least in part on the Logistic Mapping; and iterating the modifying of the variable parameter until all of the data has been encrypted.

4. A non-transitory computer-readable medium storing instructions that, when executed, cause one or more processors to perform operations for asymmetrical chaotic encryption, comprising:

determining a public key based at least in part on a private key; determining one or more Chebyshev polynomials based at least in part on the determined public key and a randomly generated integer initial value associated with a variable parameter;

determining a ciphertext control block to conceal one or more ciphertext control parameters based at least in part on the determined one or more Chebyshev polynomials;

determining a Logistic Map value based at least in part on the variable parameter;

determining a secret key and a shift integer based at least in part on the Logistic Map value;

determining an encrypted ordinary plaintext block portion of a plaintext file based at least in part on the determined secret key and the determined shift integer; and determining a finally encrypted ciphertext block based at least in part on the determined encrypted ordinary plaintext block, the determined secret key, and the determined shift integer, wherein a final ciphertext includes the determined finally encrypted ciphertext block and the determined ciphertext control block, and wherein the one or more ciphertext control parameters are determined based at least on a randomly generated integer and a length of the plaintext file.

5. The computer-readable medium of claim 4, further comprising:

updating the Logistic Map value and determining an additional finally encrypted ciphertext blocks based at least in part on the updated Logistic Map value, wherein the updated Logistic Map value is updated based at least in part on the shift integer; and iterating the updating of the Logistic Map value to until a given number of plaintext blocks are encrypted.

6. The computer-readable medium of claim 4, further comprising:

modifying the variable parameter and determining one or more subsequent Chebyshev polynomials and a subsequent finally encrypted ciphertext block based at least in part on the modified variable parameter, wherein the modified variable parameter is modified based at least in part on the determined shift integer; and iterating the modifying of the variable parameter until all of the plaintext file has been encrypted.

7. The computer-readable medium of claim 4, further comprising:

updating the Logistic Map value and determining an additional finally encrypted ciphertext block based at least in part on the updated Logistic Map value, wherein the updated Logistic Map value is updated based at least in part on the shift integer;

iterating the updating of the Logistic Map value to until a given number of plaintext blocks are encrypted;

modifying the variable parameter and determining one or more subsequent Chebyshev polynomials and a subsequent finally encrypted ciphertext block based at least in part on the modified variable parameter, wherein the modified variable parameter is modified based at least in part on the determined shift integer; and iterating the modifying of the variable parameter until all of the plaintext file has been encrypted.

8. The computer-readable medium of claim 4, wherein the public key is determined based at least in part on a Chebyshev polynomial based at least in part on the private key.

9. The computer-readable medium of claim 4, wherein the private key is determined based at least in part on iterating a Logistic Map function a number of times to obtain a binary sequence.

10. The computer-readable medium of claim 4, wherein the shift integer is determined based at least in part on iterating a Logistic Map function a number of times to obtain a binary sequence.

11. The computer-readable medium of claim 4, wherein the finally encrypted ciphertext block comprises a plaintext block portion of the plaintext file that has been encrypted two or more times based at least in part on the secret key.

12. The computer-readable medium of claim 4, wherein the finally encrypted ciphertext block comprises a plaintext block portion of the plaintext file that has been shifted two or more times based at least in part on the shift integer.

13. The computer-readable medium of claim 4, wherein the finally encrypted ciphertext block comprises a plaintext block portion of the plaintext file that has been encrypted two or more times based at least in part on the secret key, and where in the plaintext block portion of the plaintext file has been shifted two or more times based at least in part on the shift integer.

14. A non-transitory computer-readable medium storing instructions that, when executed, cause one or more processors to perform operations for asymmetrical chaotic decryption, comprising:

retrieving a Logistic map value from a ciphertext control block portion of a final ciphertext, wherein the final ciphertext includes one or more ciphertext control blocks to conceal one or more ciphertext control parameters and one or more finally encrypted ciphertext blocks, and wherein the ciphertext control parameters are determined based at least on a randomly generated integer and a length of a plaintext file; and retrieving a plaintext block from the one or more finally encrypted ciphertext blocks based at least in part on the retrieved Logistic map value.

15. The computer-readable medium of claim 14, further comprising:

determining a secret key and a shift integer based at least in part on the Logistic Map value, and wherein the retrieving of the plaintext block from the one or more finally encrypted ciphertext blocks is based at least in part on the determined secret key and shift integer.

16. The computer-readable medium of claim 14, further comprising:

updating the Logistic Map value and retrieving an additional plaintext block based at least in part on the updated Logistic Map value, wherein the updated Logistic Map value is updated based at least in part on the shift integer; and iterating the updating of the Logistic Map value until a given number of plaintext blocks are decrypted.

17. The computer-readable medium of claim 14, further comprising:

iterating the retrieving of a subsequent Logistic map value from a subsequent ciphertext control block until all of the plaintext file has been decrypted.

18. The computer-readable medium of claim 14, further comprising:
  updating the Logistic Map value and retrieving an additional plaintext block based at least in part on the updated Logistic Map value, wherein the updated Logistic Map value is updated based at least in part on the shift integer;
  iterating the updating of the Logistic Map value until a given number of plaintext blocks are decrypted; and
  iterating the retrieving of a subsequent Logistic map value from a subsequent ciphertext control block until all of the plaintext file has been decrypted.

19. The computer-readable medium of claim 14, wherein the private key is determined based at least in part on iterating a Logistic Map function a number of times to obtain a binary sequence.

20. The computer-readable medium of claim 14, wherein the shift integer is determined based at least in part on iterating a Logistic Map function a number of times to obtain a binary sequence.

21. A computing device, comprising:
  a processor; and
  a memory including an asymmetrical chaotic encryption algorithm operatively associated with the processor,
  wherein the processor is configured by the asymmetrical chaotic encryption algorithm to operatively enable the computing device to:
    determine a public key based at least in part on a private key,
    determine one or more Chebyshev polynomials based at least in part on the determined public key and a randomly generated integer initial value associated with a variable parameter,
    determine a ciphertext control block to conceal one or more ciphertext control parameters based at least in part on the determined one or more Chebyshev polynomials, wherein the one or more ciphertext control parameters are determined based at least on a randomly generated integer and a length of a plaintext file,
    determine a Logistic Map value based at least in part on the variable parameter, determine a secret key and a shift integer based at least in part on the Logistic Map value,
    determine an encrypted ordinary plaintext block portion of the plaintext file based at least in part on the determined secret key and the determined shift integer, and
    determine a finally encrypted ciphertext block based at least in part on determined encrypted ordinary plaintext block, the determined secret key, and the determined shift integer.

22. The computing device of claim 21, wherein the processor is further configured by the asymmetrical chaotic encryption algorithm to operatively enabling the computing device to:
  update the Logistic Map value and determine an additional finally encrypted ciphertext blocks based at least in part on the updated Logistic Map value, wherein the updated Logistic Map value is updated based at least in part on the shift integer;
  iterate the updating of the Logistic Map value to until a given number of plaintext blocks are encrypted;
  modify the variable parameter and determining one or more subsequent Chebyshev polynomials and a subsequent finally encrypted ciphertext block based at least in part on the modified variable parameter, wherein the modified variable parameter is modified based at least in part on the determined shift integer; and
  iterate the modifying of the variable parameter until all of the plaintext file has been encrypted.

23. A non-transitory signal bearing medium comprising machine-readable instructions stored thereon, which, if executed by one or more processors, operatively enable a computing device to:
  determine a public key based at least in part on a private key; determine one or more Chebyshev polynomials based at least in part on the determined public key and a randomly generated integer initial value associated with a variable parameter;
  determine a ciphertext control block to conceal one or more ciphertext control parameters based at least in part on the determined one or more Chebyshev polynomials, wherein the one or more ciphertext control parameters are determined based at least on a randomly generated integer and a length of a plaintext file;
  determine a Logistic Map value based at least in part on the variable parameter; determine a secret key and a shift integer based at least in part on the Logistic Map value;
  determine an encrypted ordinary plaintext block portion of the plaintext file based at least in part on the determined secret key and the determined shift integer; and
  determine a finally encrypted ciphertext block based at least in part on determined encrypted ordinary plaintext block, the determined secret key, and the determined shift integer.

24. The signal bearing medium of claim 23, wherein the machine-readable instructions further operatively enable the computing device to:
  update the Logistic Map value and determine an additional finally encrypted ciphertext blocks based at least in part on the updated Logistic Map value, wherein the updated Logistic Map value is updated based at least in part on the shift integer;
  iterate the updating of the Logistic Map value to until a given number of plaintext blocks are encrypted;
  modify the variable parameter and determining one or more subsequent Chebyshev polynomials and a subsequent finally encrypted ciphertext block based at least in part on the modified variable parameter, wherein the modified variable parameter is modified based at least in part on the determined shift integer; and
  iterate the modifying of the variable parameter until all of the plaintext file has been encrypted.

* * * * *

UNITED STATES PATENT AND TRADEMARK OFFICE
CERTIFICATE OF CORRECTION

| | | Page 1 of 3 |
|---|---|---|
| PATENT NO. | : 8,917,871 B2 | |
| APPLICATION NO. | : 13/129796 | |
| DATED | : December 23, 2014 | |
| INVENTOR(S) | : Wang | |

It is certified that error appears in the above-identified patent and that said Letters Patent is hereby corrected as shown below:

On the title page, item (57), under "ABSTRACT", in Column 2, Line 10, delete "block" and insert -- block. --, therefor.

On title page 2, item (56), under "OTHER PUBLICATIONS", in Column 1, Line 7, delete "cipertext," and insert -- ciphertext, --, therefor.

On title page 2, item (56), under "OTHER PUBLICATIONS", in Column 2, Line 14, delete "Alogorithm" and insert -- Algorithm --, therefor.

In the Drawings

In Fig. 5, Sheet 5 of 5, in Box "(515)", in Line 1, delete "Controler" and insert -- Controller --, therefor. (See attached Sheet)

In the Specification

In Column 1, below Title, insert -- CROSS-REFERENCE TO RELATED APPLICATION
The present application is a U.S. national stage filing under 35 U.S.C. §371 of International Application No. PCT/CN2010/074034, filed on Jun. 18, 2010. --.

In Column 3, Line 63, delete "considerer" and insert -- considered --, therefor.

In Column 4, Line 16, delete "PL . . ." and insert -- $P_L$ . . . --, therefor.

In Column 5, Line 16, delete "value w" and insert -- value $\omega$ --, therefor.

In Column 5, Line 41, delete "$B_i^{70}$)." and insert -- $B_i^{69} B_i^{70}$). --, therefor.

Signed and Sealed this
Sixteenth Day of June, 2015

Michelle K. Lee
*Director of the United States Patent and Trademark Office*

CERTIFICATE OF CORRECTION (continued)
U.S. Pat. No. 8,917,871 B2

In Column 6, Line 6, delete "$P^j$ may" and insert -- $P_j$ may --, therefor.

In Column 8, Line 20, delete "$k_i=m_i/P(m_i<P)$, P $m_i(m_i>P)$, 0.1666666667 ($m_i=P$)" and insert -- $k_i=m_i/P(m_i<P)$, $P/m_i(m_i>P)$, 0.1666666667 ($m_i=P$) --, therefor.

In Column 8, Line 26, delete "$k_1$ may" and insert -- $k_i$ may --, therefor.

In Column 10, Line 19, delete "block" and insert -- block $P'_j$ --, therefor.

In Column 14, Line 33, delete "and or" and insert -- and/or --, therefor.

FIG. 5